United States Patent [19]

Leslie

[11] Patent Number: 4,986,871
[45] Date of Patent: Jan. 22, 1991

[54] APPARATUS FOR MAKING HONEYCOMB-LIKE PANELING

[75] Inventor: Robert H. Leslie, Edina, Minn.

[73] Assignee: Panel Technology, Inc., Minneapolis, Minn.

[21] Appl. No.: 214,024

[22] Filed: Jun. 30, 1988

[51] Int. Cl.$^5$ .............................................. B32B 3/12
[52] U.S. Cl. .................................. 156/494; 156/197; 156/538; 156/548; 493/966
[58] Field of Search ........................ 38/102.91, 102.4; 26/51; 156/548, 197, 538, 494; 493/966

[56] References Cited

U.S. PATENT DOCUMENTS

| | | | |
|---|---|---|---|
| 2,608,750 | 9/1952 | Cluzel | 38/102.4 |
| 2,756,496 | 7/1956 | Holland . | |
| 2,759,217 | 8/1956 | Peterson | 156/494 |
| 2,919,472 | 1/1960 | Steele . | |
| 2,936,021 | 5/1960 | Steele et al. . | |
| 3,035,961 | 5/1962 | Jones et al. . | |
| 3,226,861 | 1/1966 | Bird | 38/102.91 |
| 3,265,862 | 8/1966 | Smith, Jr. | 156/380.9 |
| 3,315,301 | 4/1967 | Dibblee | 38/102.91 |
| 3,483,070 | 12/1969 | Kennedy | 156/197 |
| 3,507,062 | 4/1970 | Moyer | 38/102.91 |
| 3,519,510 | 7/1970 | Ardolino et al. . | |
| 3,607,518 | 9/1971 | Ellinor . | |
| 3,700,522 | 10/1972 | Wonderly | 156/197 |
| 3,810,800 | 5/1974 | Doll . | |
| 3,819,439 | 6/1974 | Taylor . | |
| 4,249,974 | 2/1981 | Wilson . | |

OTHER PUBLICATIONS

"The Core of the Job", Hexagon Honeycomb Corporation, Date of publication unknown, pp. 6–9.
Report No. NER-338, "Honeycomb Sandwich Panels", Mar. 1987, Council of American Building Officials. National Evaluation Service Committee.

*Primary Examiner*—Michael W. Ball
*Assistant Examiner*—Michele K. Yoder
*Attorney, Agent, or Firm*—Merchant, Gould, Smith, Edell, Welter & Schmidt

[57] ABSTRACT

A honeycomb panel manufacturing system and method comprises expansion tables, a curing chamber, adhesive application table, and a pressing station for bonding face sheets to honeycomb panels. The method of manufacture comprises expanding honeycomb material, curing expanded panels, and pressing face sheets onto opposite sides of cured panels.

12 Claims, 12 Drawing Sheets

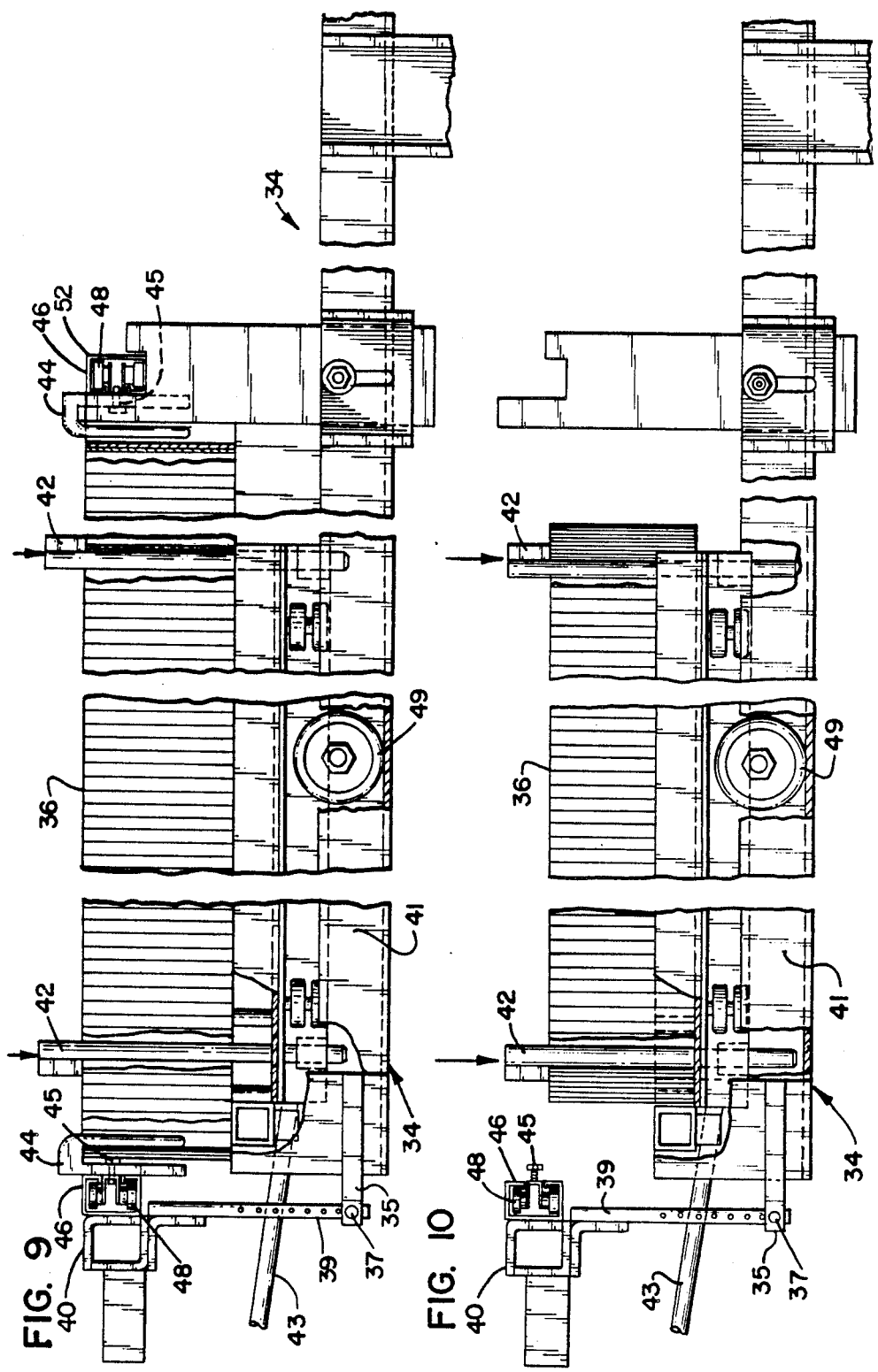

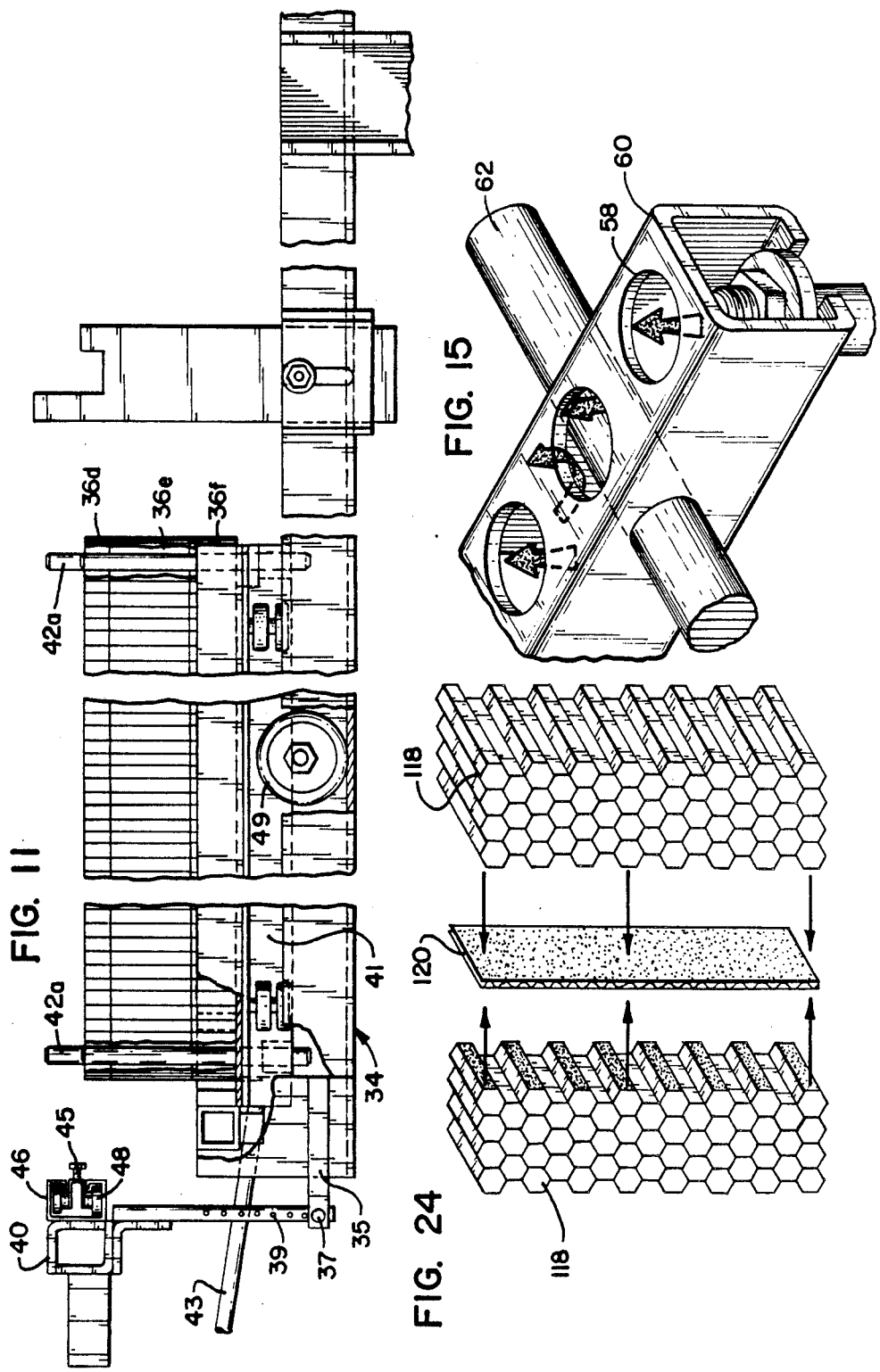

APPARATUS FOR MAKING HONEYCOMB-LIKE PANELING

BACKGROUND OF THE INVENTION

The present invention relates to an apparatus and method of manufacturing honeycomb panels. Honeycomb panels are well known and are used for a variety of purposes in which lightweight yet strong building panels are required. The making of panels is also well known and comprises the primary steps of (1) expanding a center honeycomb panel, (2) curing the expanded panel and (3) sandwiching the panel between opposing face sheets by the use of adhesive. Mass production of these panels has been done by a continuous process in which the panels are expanded and rolled to proper shape and continued onward through a curing chamber. In a separate step, face sheets are bonded to the panels. Any change in the size of the panel being manufactured requires that the entire operation be stopped and that adjustments are made so that the new size panels can be produced. The changeover time is lengthy and becomes very expensive and inefficient when panels of greatly varying sizes and small numbers are required.

The present invention provides for varying the shape and size of panels being manufactured without sacrificing speed, quality or efficiency. In this manner, a specification requiring several different size panels can be produced in an efficient manner with little loss of time for changing the manufacturing machinery. The present invention allows variability in the size of each individual panel that is being produced. The changeover time is relatively small. In this manner, panels can be manufactured which closely meet the user's specifications and do not require later modification.

The flexibility in production is not possible with other honeycomb panel manufacturing devices. Although other devices are capable of producing large quantities of panels, they are not capable of producing variable sizes and shapes in an efficient manner. The present device allows production of wide ranging shapes and sizes to fit the specific job in a fast manner which maintains uniformity, thereby increasing quality.

In addition to solving this problem, the present invention solves numerous other problems associated with the prior art.

SUMMARY

Honeycomb panels are manufactured by expanding one or more sheets of hobe, or unexpanded honeycomb material, at an expansion table. The unexpanded honeycomb material is placed on a movable top portion of the expansion table. The expansion table has a header bar and a tow bar with pins insertable into the unexpanded honeycomb material. The tow bar is then pulled across the length of the expansion table. The pins grip across ends of the hobe and expand the hobe while the tow bar is pulled across the table. The movable top portion and its associated expanded honeycomb panel are then moved into an oven curing chamber where the expanded honeycomb material is cured. After curing, the movable top portion and its associated expanded honeycomb panel are removed from the curing chamber and face sheets are attached to opposing sides of the expanded honeycomb material.

In one embodiment, longitudinally extending spacers are placed on the movable top portion to provide for expansion of several separate panels placed side by side and to provide concurrent expansion of differing widths of panels.

In one mode, pins are placed through several sheets of unexpanded hobe, thereby expanding several panels placed one on top of another at the same time.

In a preferred embodiment, the expansion tables are disposed adjacent both ends of the curing chamber. Expanded panels are rolled along with the movable top portion of the expansion table into the curing chamber of an oven where the expanded honeycomb panels are cured. The curing chamber is designed to facilitate uniformity of temperature, air circulation, heat distribution, pressure, and humidity. The curing chamber preferably has a plurality of vents and circulates air throughout the chamber and not out a single orifice. The chamber preferably has a heat sink to retain heat during the expansion and curing process so that the curing chamber will not cool down significantly while doors are open for inserting and removing panels. Curing takes place while the panels are still attached to the movable top portion of the expansion table. The expansion tables are situated at either end of the curing chamber with doors leading into both ends of the curing chamber so that panels are expanded on one table while the expanded panels from the opposite table are being cured. In this manner, honeycomb panels are manufactured in a much shorter time. This also cuts down on setup time as each table is specifically set for different size panels, thereby providing for manufacturing of several different size honeycomb panels at the same time.

After the panels have been expanded and cured, face sheets are attached. The face sheets have adhesive applied on one side at an adhesive application table. In one embodiment, the adhesive application table uses a single roller extending transversely across the adhesive application table, the roller picks up adhesive and transfers the adhesive to the face sheet as the face sheet is pulled across the table. The amount of adhesive applied to the face sheet is varied by using rollers with different naps, and varying the amount of adhesive picked up by the roller. After adhesive is applied, face sheets are placed on opposing faces of the expanded honeycomb panels. The honeycomb panels are then pressed onto the face sheets for a finished product. In a preferred embodiment, a pressing station enables concurrent pressing of several panels placed one on top of another. The pressing station comprises an upper and lower portion which are chained together. The upper portion includes an air bag which inflates to push an upper pressing plate against the panels and associated face sheets which are sandwiched in between the upper plate and the lower bed portion. The air bag is preferably a peripheral type bag which maintains uniform pressure across the entire pressing surface, thereby allowing less rigid construction of a pressing plate and avoiding areas of pressure variance. In a preferred embodiment, the air bag has a footprint substantially the same as the expanded honeycomb panel. The upper and lower portions of the pressing station are preferably of a modular construction. The modular sections are attachable to other modular sections, thereby providing for pressing of much larger honeycomb panels, and allowing greater flexibility in manufacturing. Large dummy panels are placed above and below a column of stacked panels on joined modular sections to give a larger pressing surface.

These and various other advantages and features of novelty which characterize the invention are pointed out with particularity in the claims annexed hereto and forming a part hereof. However, for a better understanding of this invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views;

FIG. 9 is a elevational view with sections removed, showing the expanding process along an upper surface;

FIG. 10 shows an elevational view with sections removed, showing an expanded honeycomb panel being pinned into the table;

FIG. 11 shows an elevational view with sections removed, showing stacked honeycomb panels with different thicknesses being simultaneously expanded;

FIG. 15 is a fragmented perspective of the center support bar of the curing chamber;

FIG. 24 shows a process of sealing scrap sheets of honeycomb materials.

DETAILED DESCRIPTION OF THE DRAWINGS

Figure 1:
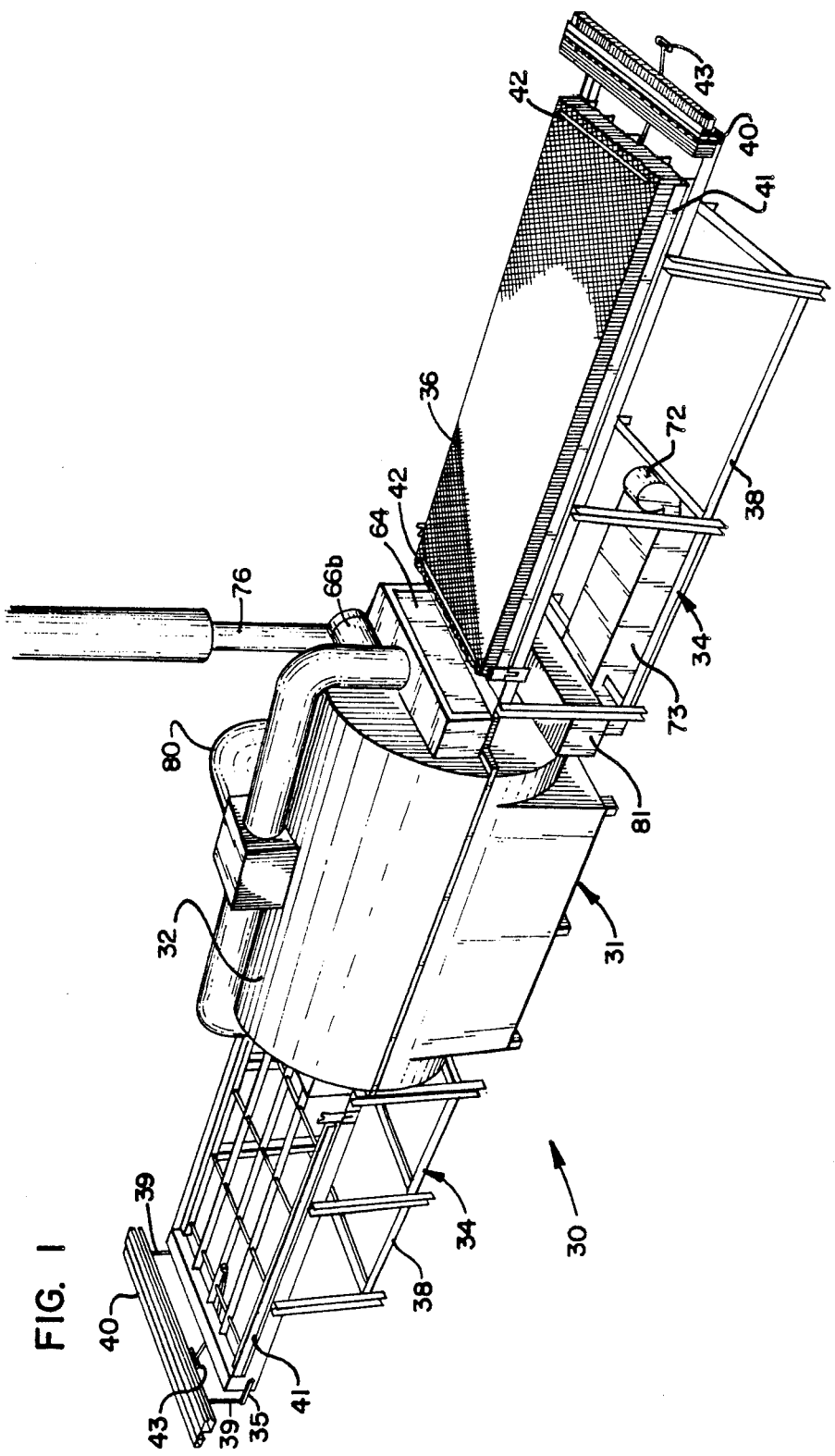
FIG. 1 is an overall perspective of the curing oven and expansion table.
Figure 2:
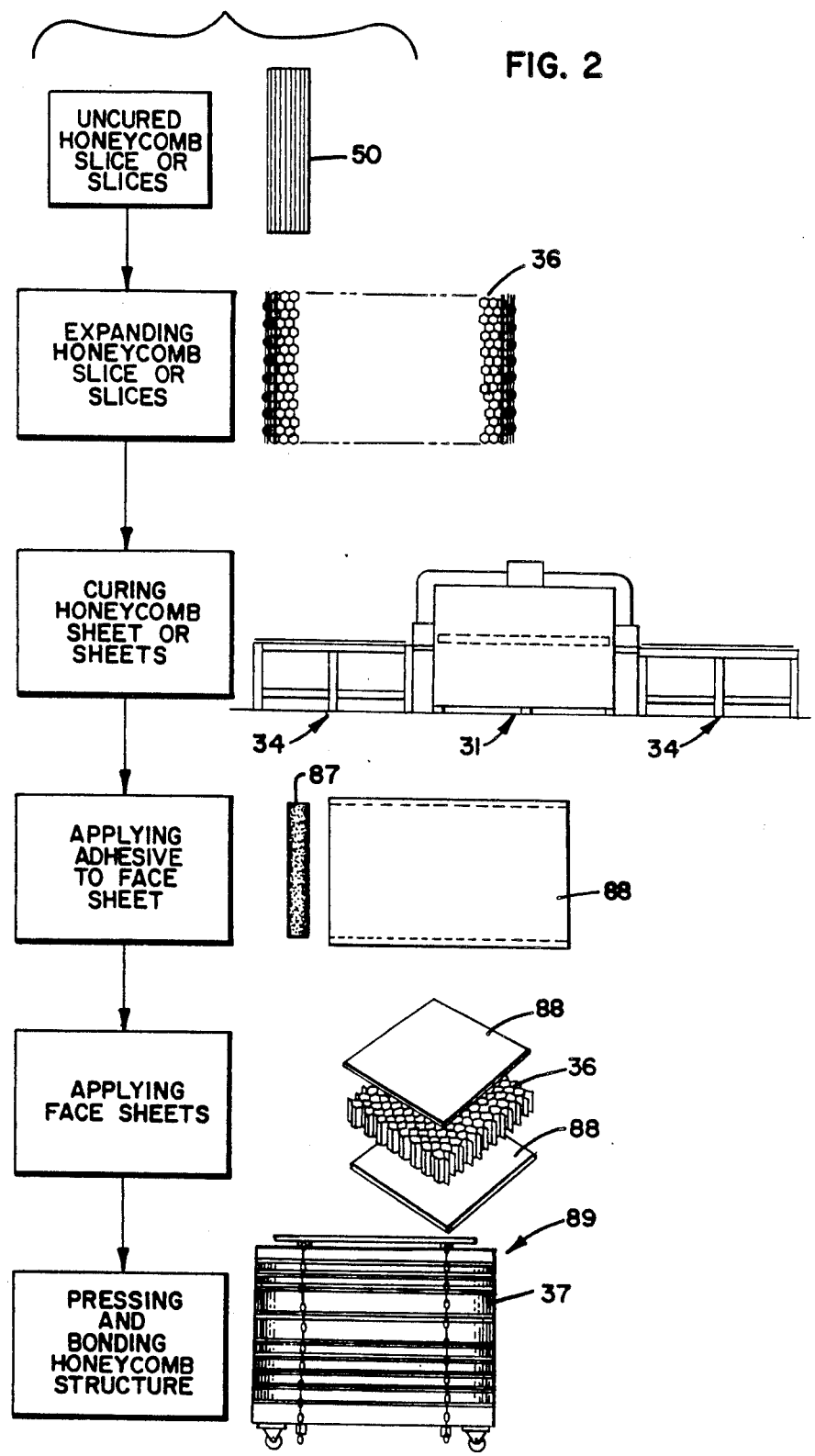
FIG. 2 shows a process flow chart for manufacturing honeycomb panels.

Referring now to the figures, there is illustrated in FIG. 1 embodiments of a honeycomb panel expanding and curing apparatus 30 in accordance with the principles of the present invention. As shown in FIG. 2, honeycomb panels 36 are manufactured by expanding one or more panels of uncured, unexpanded honeycomb material, or hobe 50 on an expansion table 34 into a fully expanded state and then curing the expanded panels 36 in a curing chamber 32 of an oven 31. After curing, opposing face sheets, or skins, 88 are adhesively applied to the cured and expanded panels 36, which are then pressed to form a finished panel 37. Finished panels 37 are then ready for use in various types of construction.

Figure 3:
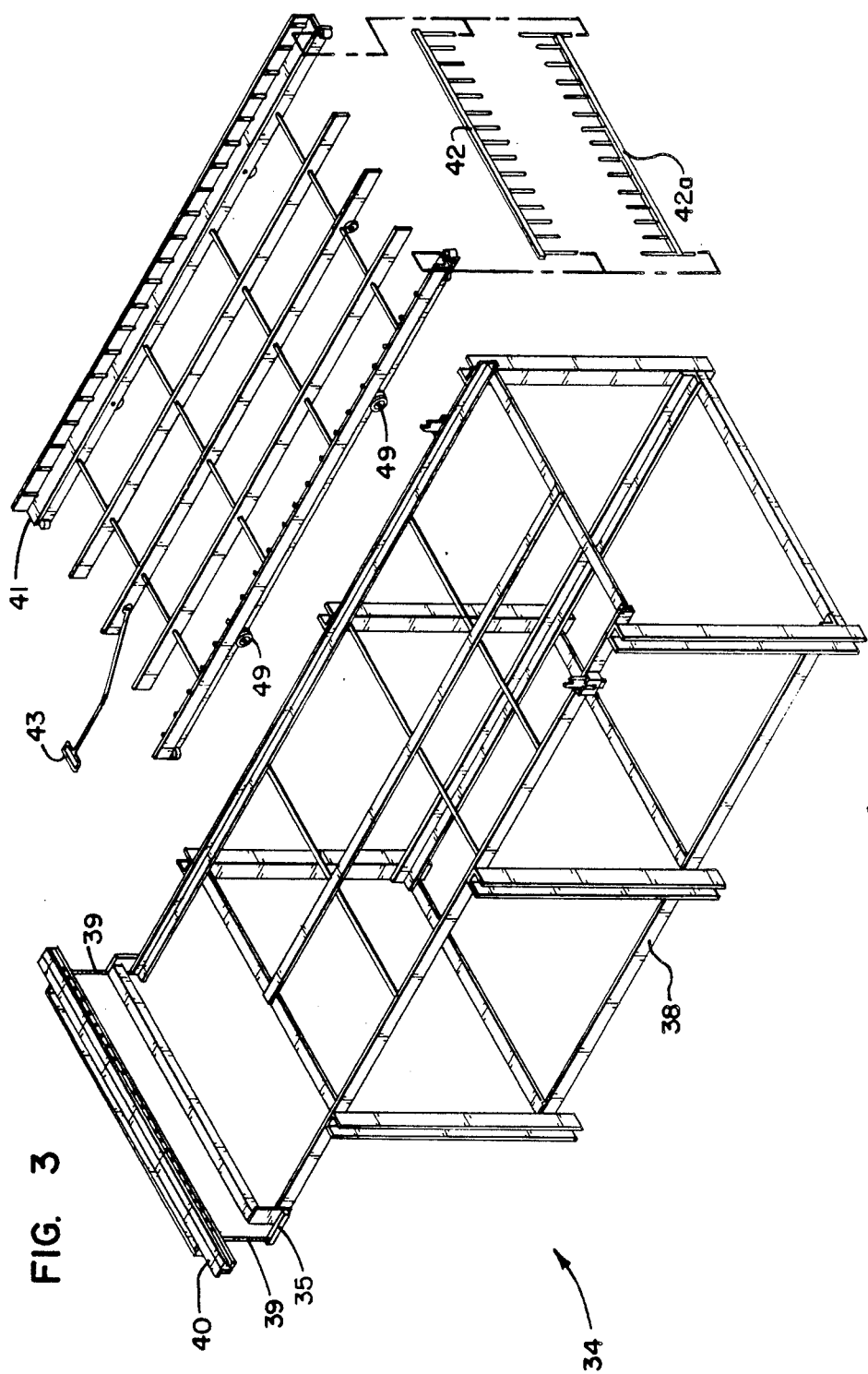
FIG. 3 is an exploded perspective of the expansion table.

FIG. 3 shows an exploded view of the expansion table 34. A lower frame portion 38 supports a movable top portion 41 which adapts to various sizes of honeycomb panels 36. Pinning racks 42 are placed within expanded panels 36 proximate their ends to hold expanded panels 36 in an expanded state during curing. (In FIG. 3, the pinning racks 42 are shown only proximate one end of the top table portion 41.) The racks 42 are typically placed downward through both ends of expanded panels 36 and into brackets on the movable top portion 41 so as to hold the panels in their expanded state on the movable top portion 41 which rolls into the curing chamber 32 of the oven 31. For very thin panels, the pinning racks 42a might be placed up through expanded panels 36 for better curing.

Figure 5:
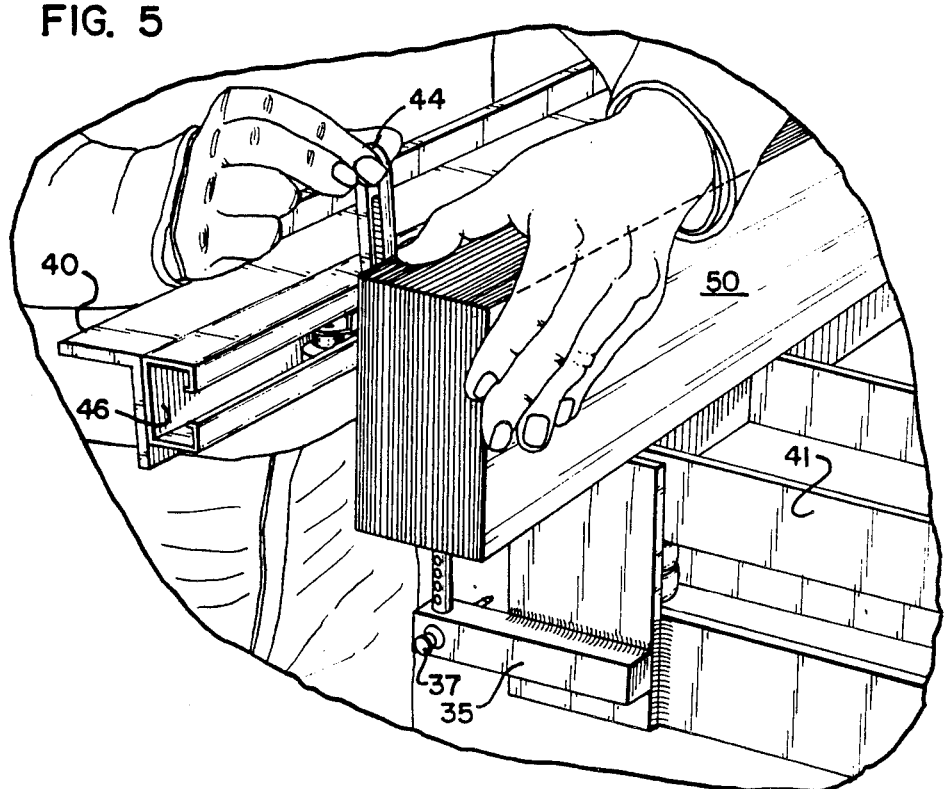
FIG. 5 is a perspective of the attachment process.
Figure 4:
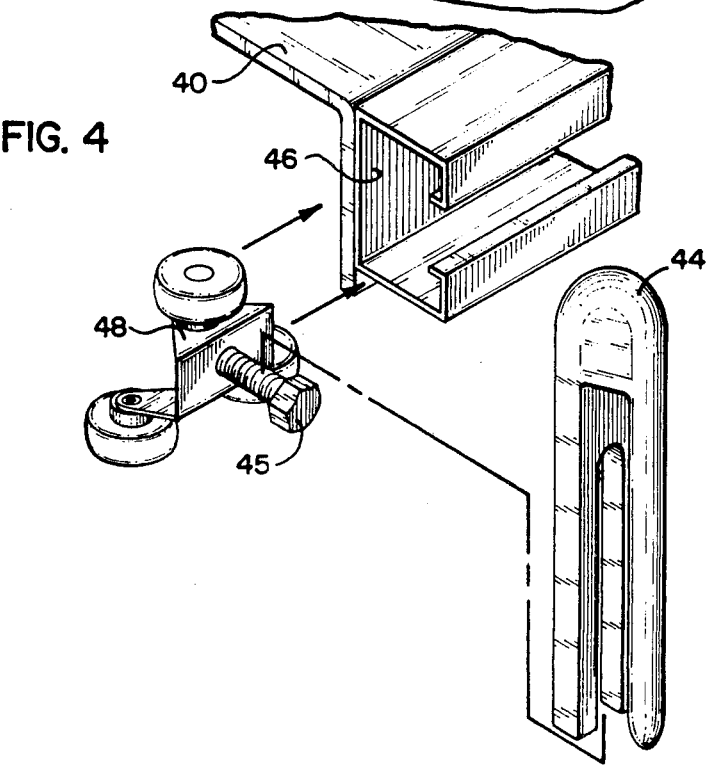
FIG. 4 is a detailed exploded perspective of a gripping pin mounting to the header bar.

As shown in FIGS. 4 and 5, a header bar 40 is suitably mounted by support brackets 35 at an end of the expansion table 34 opposite the oven 31. The header bar 40 is vertically adjustable by use of a rod 39 having multiple apertures and a pin 37 removably insertable therethrough. The header bar 40 supports gripping pins 44 which are attached to rollers 48 for sliding in channel 46 of the header bar 40. In a preferred embodiment, the pins 44 straddle bolts 45 mounted on the rollers 48. The rollers 48 provide for inward sliding in channel 46 during expansion when hobe 50 lengthens and narrows during expansion. As shown in FIG. 5, the gripping pins 44 are placed into unexpanded panel material 50 for gripping ends of honeycomb panels 36 during expansion. The pins 44 are free to pivot on mounting bolts 45 so as to have universal movement and slide inward as the panel 36 expands and narrows. It will be appreciated that alternate embodiments might be utilized for the header bar 40; e.g., a Thompson TM bar arrangement.

Figure 6:
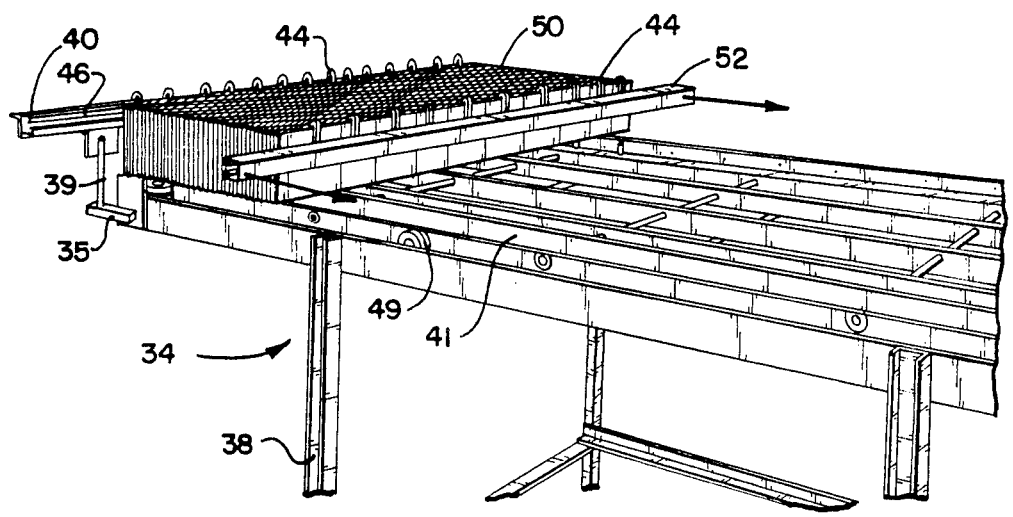
FIG. 6 is a perspective of the expanding process.
Figure 7:
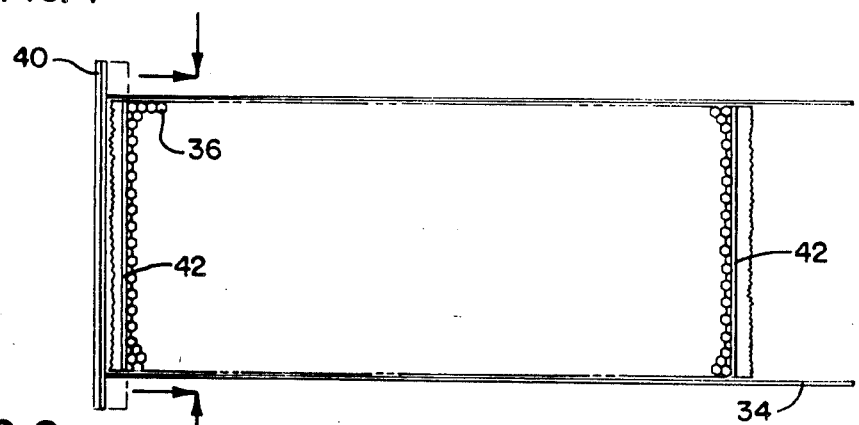
FIG. 7 is a top plan of a honeycomb sheet expanded and pinned in place.
Figure 8:
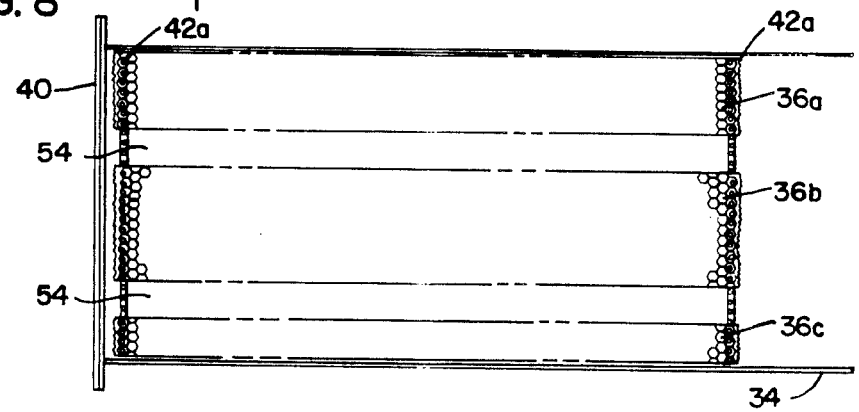
FIG. 8 is a top plan of several smaller expanded honeycomb panels.

FIG. 6 shows the expansion process with the honeycomb panel 36 in a stage of partial expansion. A movable tow bar 52 having a structure similar to that of the header bar 40, is attached to an end of the hobe 50 opposite the header bar 40 in much the same manner as the header bar 40. The tow bar 52 is manually pulled in the direction of the arrow during expansion but may also be automatically controlled such as by the use of hydraulics, chain drives, belt drives, etc. The honeycomb panel 36 is pulled in this manner until fully expanded, as shown in FIG. 7. FIG. 8 shows an embodiment of the expansion table 34 having narrow honeycomb panels 36a, 36b, and 36c being expanded at the same time. Spacers 54 separate the panels 36a, 36b, and 36c and provide for flexibility for expanding various size panels 36a, 36b and 36c at the same time.

FIGS. 9 and 10 show a side view of expanded honeycomb panels 36 during the expansion process. FIG. 9 shows the panel wherein the expanded panel 36 is fully expanded. FIG. 10 shows an expanded panel 36 and the pinning racks 42 placed int the expanded honeycomb panel 36, thereby securing the expanded panel 36 onto the expansion table movable top portion 41 for sliding on rollers 49 along a track of the expansion table 34 into the curing chamber 32 of the oven 31. FIG. 11 shows the expansion table 34 with panels substantially expanded. Different thickness panels 36d, 36e and 36f have been stacked one on top of another and expanded simultaneously. The honeycomb panels 36d, 36e and 36f are pulled and expanded by the pins 44 from the header bar 40 and the tow bar 52 reaching down through the various thicknesses, thereby allowing expanding of a number of vertically stacked panels 36d, 36e and 36f. In the embodiment shown, panels can be stacked up to six (6) inches high during expansion.

Figure 12:
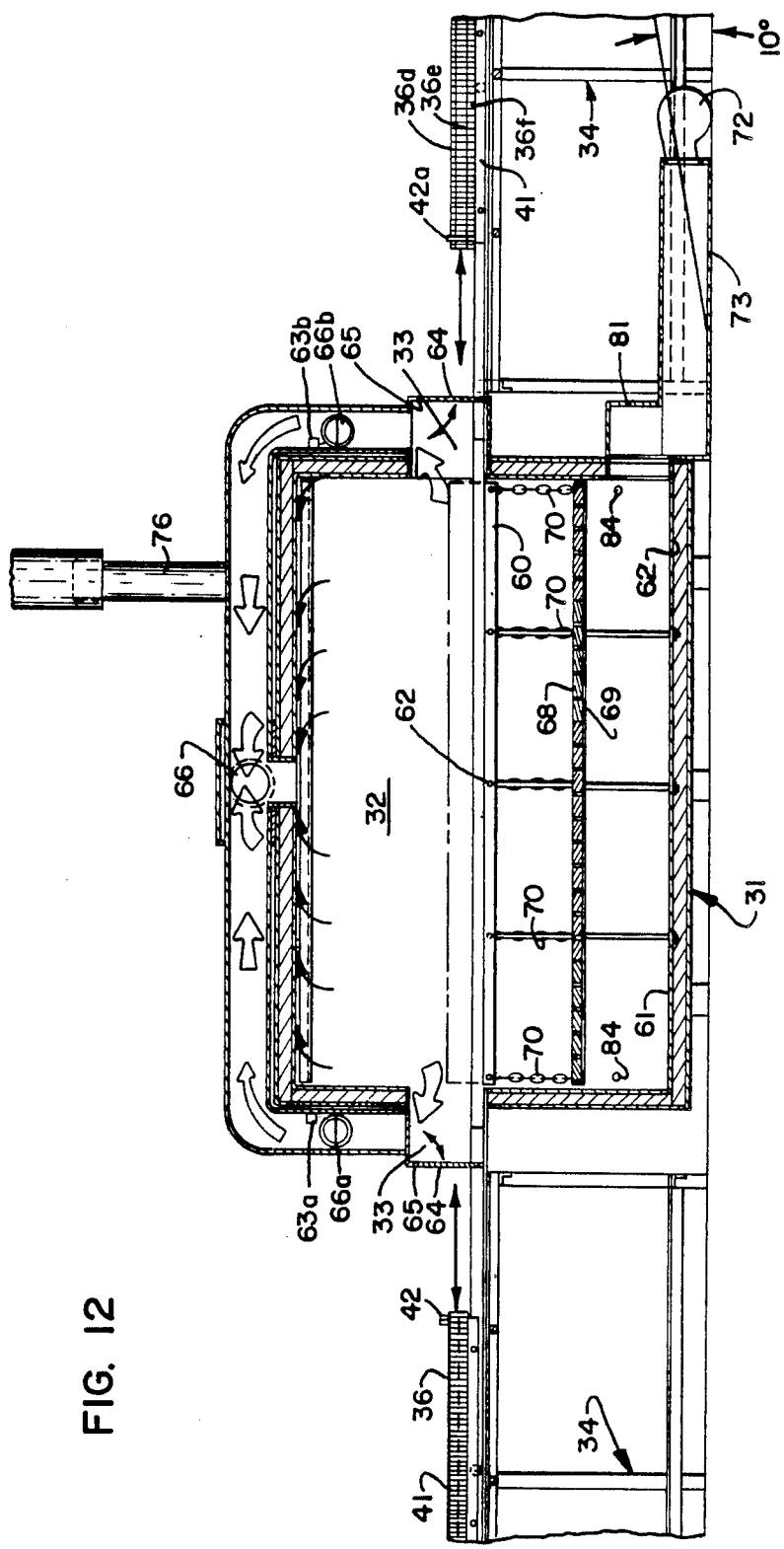
FIG. 12 shows a longitudinal cross section of the curing oven and expansion tables.

FIG. 12 is a cross section of a longitudinal view of the oven 31 and the cylindrical curing chamber 32 and with expansion tables 34 adjacent both ends of the oven 31. The curing chamber 32 comprises a substantially cylindrical inner chamber 63 which contains a heat sink 68 supported by a frame 69 hung on adjustable chains 70 and disposed below the expanded honeycomb panels 36 rolled into the chamber 32 on the expanding table movable top portion 41 during the curing process. The heat sink 68 touches inner walls 61 and provides for increased temperature uniformity and air circulation and typically keeps curing time at 15-60 seconds depending on air flow. Expanded panels 36 enter the curing chamber 32 at both ends through doors 64 mounted to pivot upward about a horizontal axis 65. The doors 64 normally remain closed during the curing process. The doors 64 open into an area 33 of the curing chamber 32 of reduced size such that the flow of venting gases is much greater proximate the doors 64, thereby rapidly venting off through the vent system any cool ambient air introduced by opening the doors 64. The honeycomb panels 36 are pushed into the chamber on the expansion table movable top portion 41 by a handle 43, suitably attached to the movable top portion 41. The handle 43 projects out through a door slot 65, providing for a reduced area of opening at the door 64, and remains outside the curing chamber 32 during curing so as to enable the expansion table movable top portion 41 and its associated honeycomb panel 36 to be removed from chamber 32 after curing.

Figure 13:
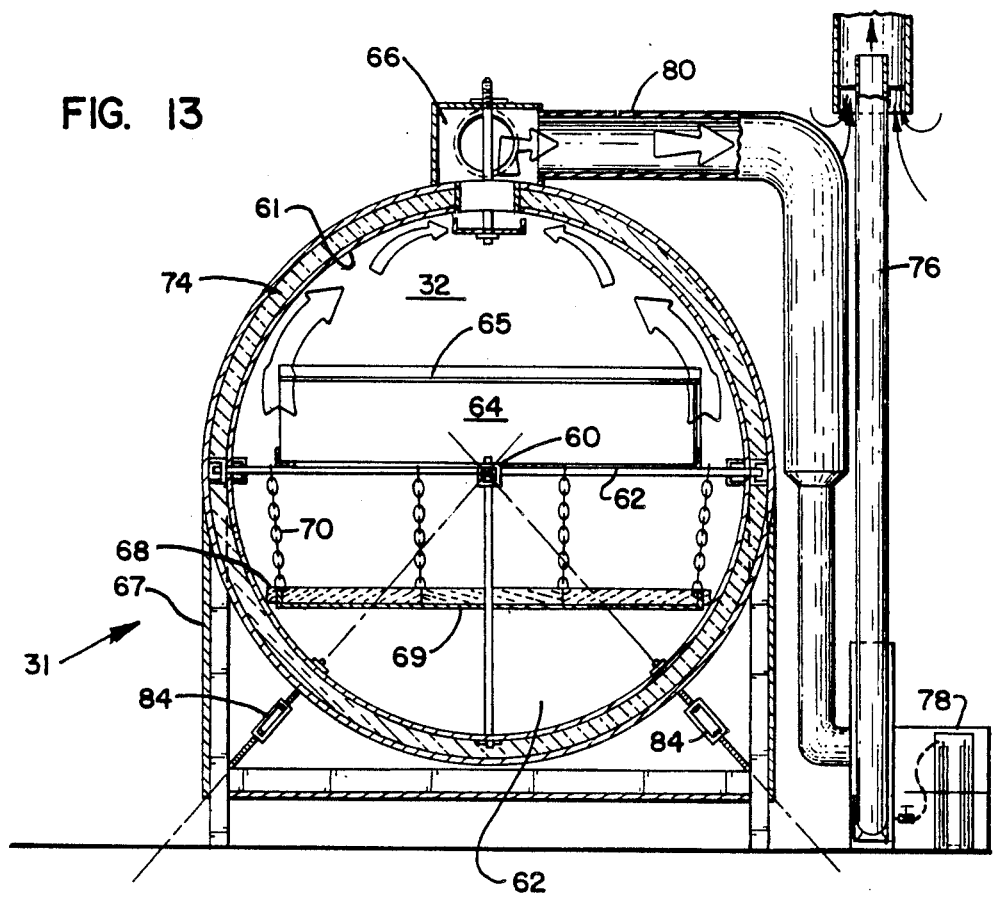
FIG. 13 shows a transverse cross section of the curing chamber.
Figure 14:
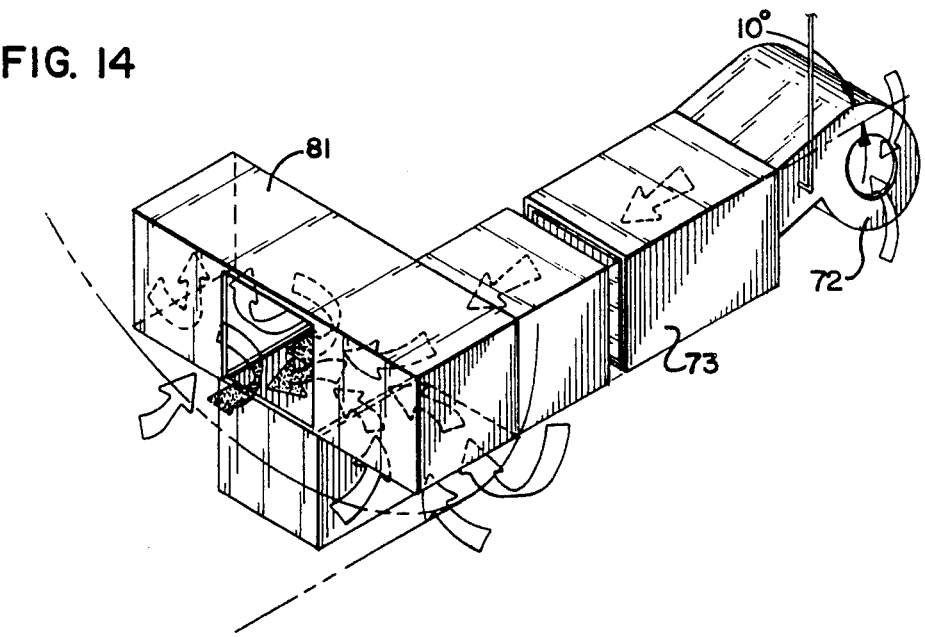
FIG. 14 is a diagrammatic view of the air heating and mixing chamber.

Referring to FIGS. 12 through 14, air flow is provided by a fan 72 forcing air through a conduit 73 and into a mixing chamber 81 which mixes outside air with heated air inside the curing chamber 32 for improved circulation. In a preferred embodiment, the mixing chamber 81 is located proximate to one end of the curing chamber 32 at a lower portion of the curing chamber 32. Air is exhausted through venting 66 where it is controlled by barometric sensing 78 and to maintain a vacuum, typically being 5 inches of water. Two vents 66a and 66b are disposed proximate the doors 64 and include barometers 63a and 63b to insure uniform venting. Air exhausted from the ends and top leaves through a central pipe 80 after barometric venting, air is exhausted through a stack 76 where new air is mixed to provide improved temperature and humidity control of exhausted air. The cylindrical shape of the chamber 32 provides greater air circulation and temperature uniformity. The walls are provided with insulation 74 to typically maintain a curing temperature of 350-370°F. The honeycomb panels 36 are supported in the center of the cylindrical chamber 32. A center frame 60, extending longitudinally through the curing chamber 32, and cross frame members 62, extending transversely through the curing chamber 32, provide support for the movable top portion 41. The cylindrical curing chamber 32 is supported by a framework 67 and held by tensioners 84. The center frame 60 provides greater air circulation to the panels 36 through venting holes 58 as shown in FIG. 15.

Figure 16:
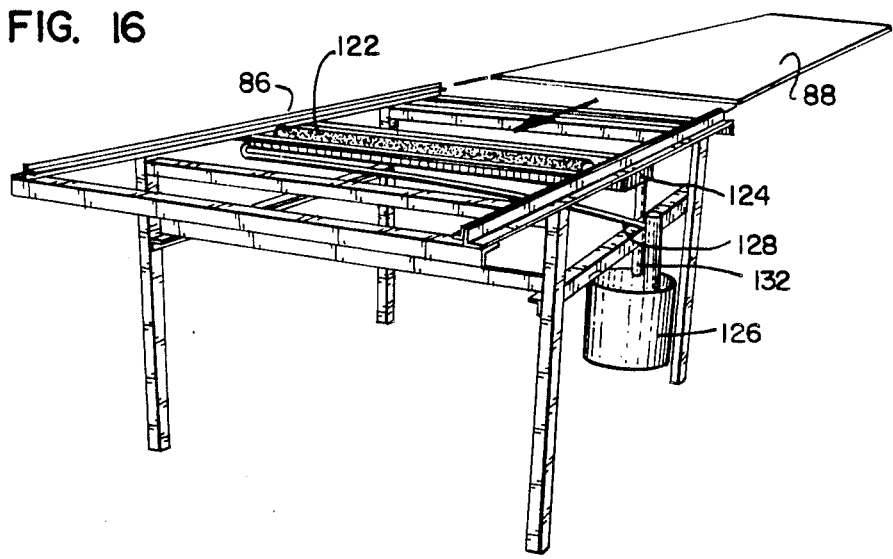
FIG. 16 is a perspective of the adhesive application table.
Figure 18:
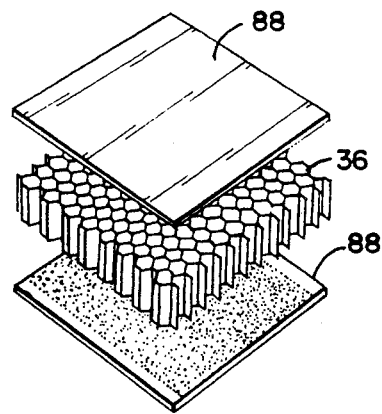
FIG. 18 is a diagrammatic view of the face sheet being applied to the honeycomb panel.
Figure 17:
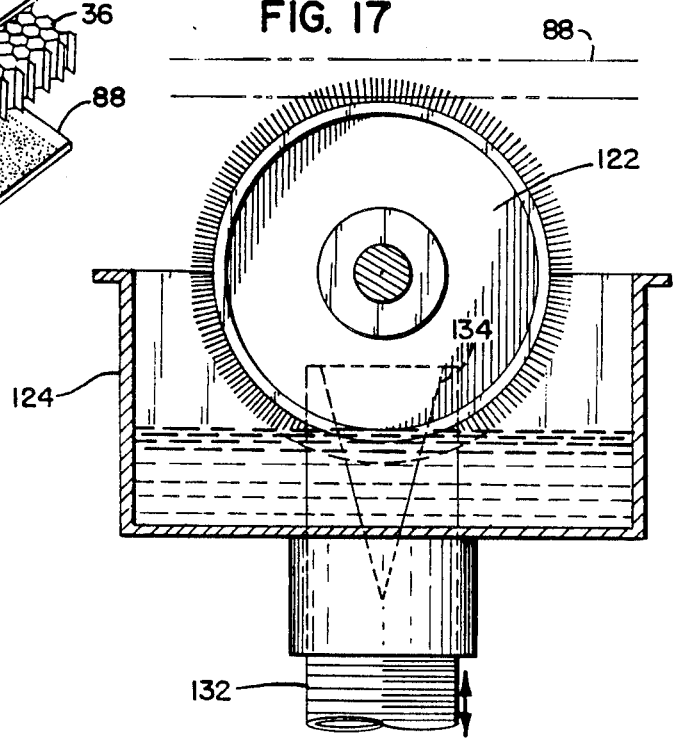
FIG. 17 is an enlarged end view of the adhesive application table roller.

FIG. 16 shows the adhesive application table 86 where face sheets 88 have adhesive applied. The adhesive application table 86 comprises a roller 122 extending transversely across the adhesive application table 86. The roller 122 mounts above a bottom of a trough 124 containing adhesive. The adhesive circulates from a holding tank 126 to the trough 124 through a line 128 by a sump pump not shown. The adhesive flows out the trough 124 back to tank 126 through a threadably adjustable drain pipe 132 at one end of the trough 124 beyond the end of the roller 122. The drain pipe 132 has a v-shaped side slot 134 to ensure drainage of the trough 124. The level of circulating adhesive is controlled by raising or lowering the drain pipe 132. By controlling the level of adhesive in the trough 124, the amount of adhesive picked up by the roller 122 is varied, thereby varying the amount of adhesive applied to the face sheet 88. The amount of adhesive applied to face sheets 88 typically varies from 0.004-0.012 inches and is also controlled by interchanging rollers 122 having different naps. For example, in applying a thin layer of adhesive to a smooth surface, a nonporous foam rubber roller is typically used; in applying a thin layer of adhesive to a rough surface, a medium nap wool roller is typically used; and in applying a thick adhesive layer to a rough surface, a wool roller having a thick nap is typically used. As shown in FIG. 18, the face sheets 88 are then adhesively attached to the expanded panels 36 by conventional means.

Figure 19:
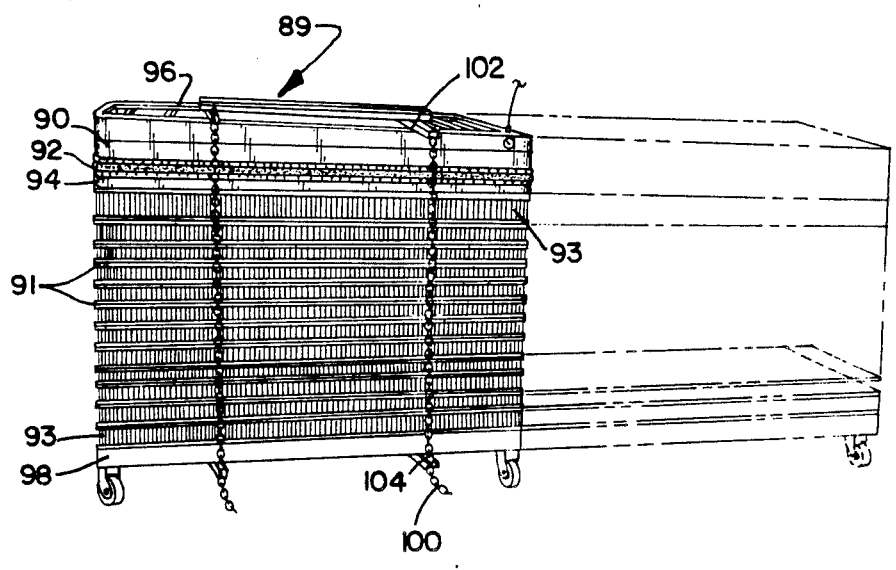
FIG. 19 is a perspective view of the pressing station with an alternate size in phantom.
Figure 20:
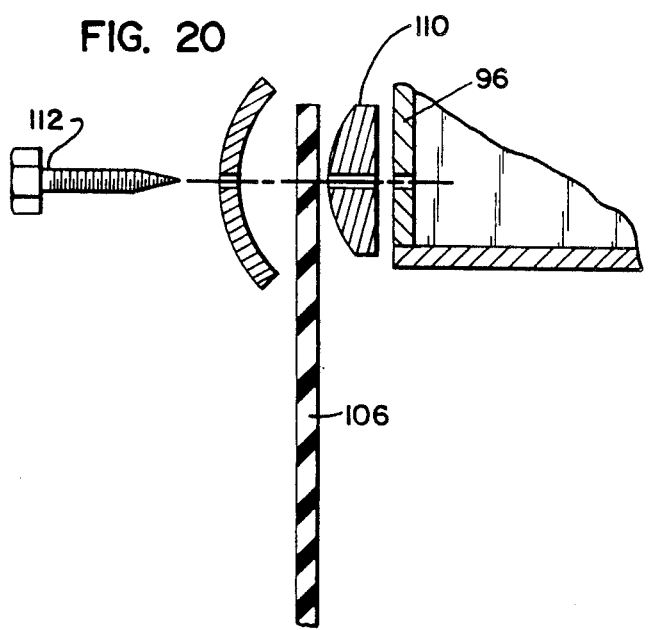
FIG. 20 is a sectional view of the air bag wall attachment to the upper press section.

FIG. 19 shows a pressing station 89. The pressing station 89 comprises a lower bed portion 98 and a top portion 90. A dummy honeycomb panel 93 is placed on the bed portion 98 and directly below the top portion 90. Stacked panels 91 are stacked above the dummy panel 93 on the bed portion 98 and under the dummy panel 93 below the top portion 90. The bed portion 98 and the upper portion 90 are adjustably coupled by chains 100 extending between attachment brackets 102 and 104. An inflatable pressurized air bag 92 fits between an upper plate 96 and a pressing plate 94 to tighten the top portion 90 onto the stacked panels 91, thereby providing for compressing and bonding face sheets 88 to cured panels 36. The air bag 92, as shown in FIG. 20, attaches to the upper plate 96, by small screws spaced around the periphery of the upper plate 96. Screws 112 go through the air bag wall 106 and through a cushioning portion 110 into the upper plate 96. This ensures even attachment of the upper edge of the air bag 92 to the upper plate 96, and provides for uniform pressing of the stacked panels 91. In a similar manner, the air bag 92 is attached to the pressing plate 94 at a lower edge. It is appreciated that the air bag 92 cooperates with the pressing plate 94 and upper plate 96 to form a single inflatably adjustable chamber.

Figure 21:
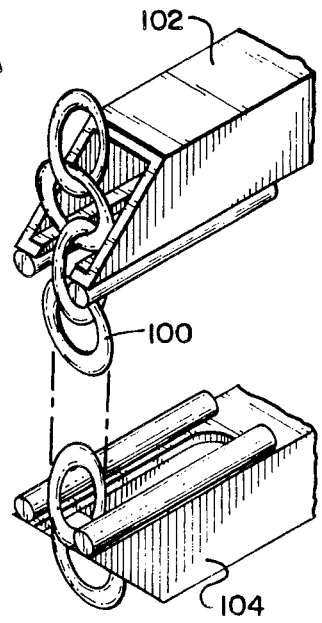
FIG. 21 is a detail of attachment brackets and chains on a press station.

As shown in FIG. 21, the chains 100 attach to the top slotted brackets 102 of the upper plate 90 and to the associated bottom slotted brackets 104 of the bed portion 98. With this arrangement, the chains 100 can be adjusted by inserting different chain links into slots in the slotted brackets 102 and 104, thereby changing the effective length of the chains 100 and the distance between the bed portion 98 and pressing plate 94 to provide for pressing the panels 91 by inflating the air bag 92.

The peripheral air bag 92 has a footprint substantially the same size as the pressing plate 94 and applies even pressure on the entire pressing plate 94, providing for less rigid construction of the pressing plate 94. The air bag 92 and pressing plate 94 have footprints substantially the same size as the stacked panels 91 and provide even distribution of pressure to the stacked panels 91, which allow lower pressures during pressing. Pressing time and pressure depends on the adhesive used. Urethane adhesives typically require 1 psi for 90 minutes. Isocyanate adhesives typically require 2.5 psi for 90–150 minutes.

Figure 22:
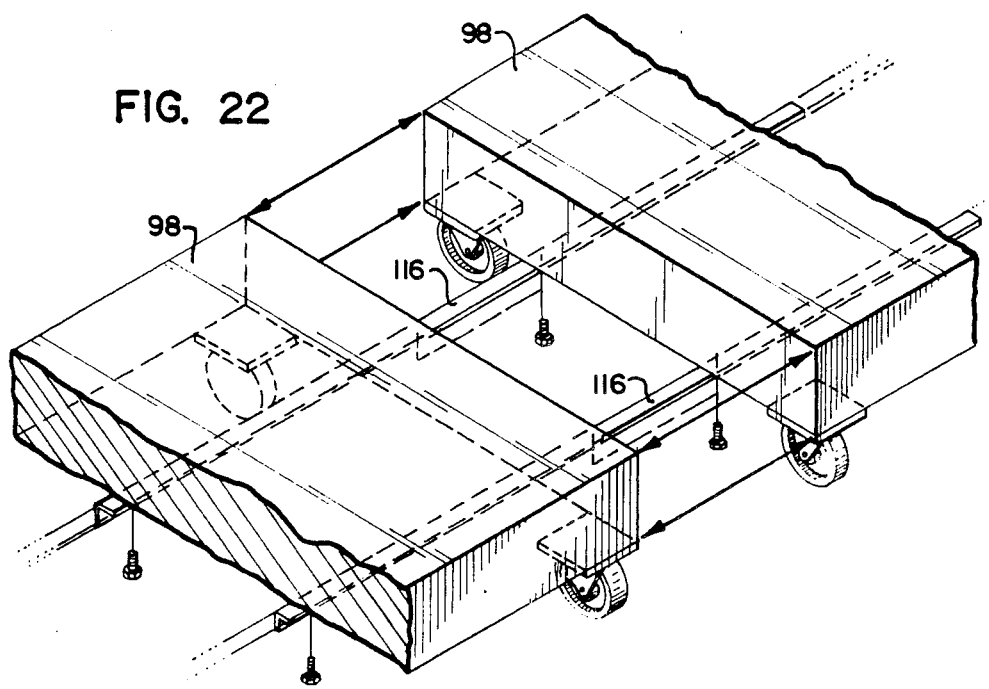
FIG. 22 shows a detail of the bottom portion of a press station modular section being attached to adjacent modular sections for increased size.
Figure 23:
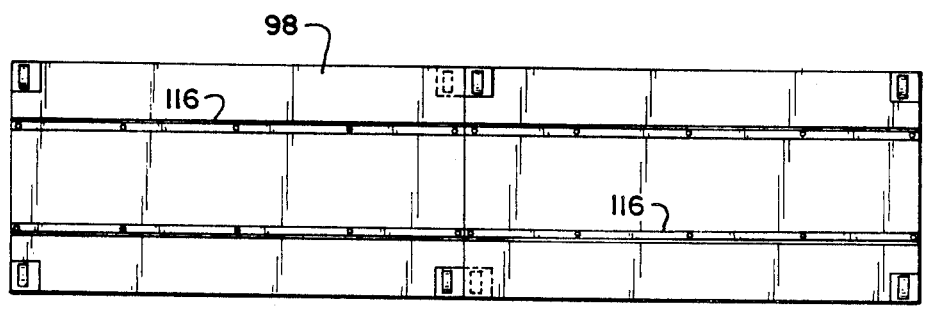
FIG. 23 shows two press modular sections combined for a larger pressing station.

FIGS. 22 and 23 show the bed portion 98 being attached to other bed portions, providing for pressing of larger panels. Modular construction allows attachment of bed and top portions 98 and 90 without sacrificing pressing uniformity. As show in FIG. 22, ends of the bed portion 98 are rolled on wheels end to end and connected by brackets 116 being bolted into the bottom of each panel. Thus, larger pressing areas as shown in FIG. 23 are possible for pressing larger honeycomb panels. When modular pressing stations 89 are joined, large dummy panels 93 cover pressing surfaces of the joined pressing stations 89 to provide an enlarged even pressing surface. The dummy panels 93 thus provide uniform pressure across the stacked panels 91.

As shown in FIG. 24, honeycomb pieces 118 can be pressed together to form larger usable pieces. As illustrated in FIG. 24, a cardboard piece 120 with adhesive applied is placed between two honeycomb pieces 118. The pieces 118 are then pressed together to form a usable honeycomb panel 36. In this manner, larger panels 36 may be made and scrap pieces may be saved and used.

It is to be understood that even though the above numerous characteristics and advantages of the invention have been set forth in the foregoing description, together with the details of the structure and function of the invention, the disclosure is illustrative only, and changes may be made in detail, especially in matters of shape, size and arrangement of parts within the principles of the invention, to the full extent indicated by the broad, general meaning of the terms in which the appended claims are expressed.

What is claimed is:

1. An expanding and curling apparatus used in expanding and curing honeycomb panels, comprising:
    adjustable expansion table means for expanding honeycomb panels of varying sized and thicknesses, the expansion table means comprising a horizontally movable top portion supporting the honeycomb panels;
    curing chamber means for curing expanded honeycomb panels at a substantially uniform temperature, pressure, and air circulation during the curing process, the curing chamber means being adjacent the expansion table means, so that the horizontally movable top portion rolls with the expanded honeycomb panel into the curing chamber means, the curing chamber means including support means for supporting the horizontally movable top portion inside the curing chamber means during the curing process.

2. An apparatus in accordance with claim 1 wherein the curing chamber means comprises heat retention means located within the curing chamber means and disposed below the horizontally movable top portion in the curing chamber means, for maintaining temperature uniformity over time and space within the curing chamber means.

3. An apparatus in accordance with claim 1, wherein the horizontally movable top portion includes handle means for inserting and removing the horizontally movable top portion from the curing chamber means and wherein the curing chamber means comprises doors having a slot through which the handle means of the horizontally movable top portion of the expansion table means project, thereby providing for pulling the expanded panels attached to the horizontally movable top portion out of the curing chamber means without reaching into the curing chamber means.

4. An apparatus in accordance with claim 1, the curing chamber means having exhaust means for exhausting air through a plurality of exhaust vents, thereby maintaining uniform air pressure and circulation.

5. The apparatus in accordance with claim 4 wherein the exhaust means comprise barometric damper means associated with the exhaust vents for maintaining even pressure and air flow.

6. The apparatus in accordance with claim 4, the curing chamber means having a different air pressure than ambient air, thereby the exhaust means creates a venturi effect to draw off gasses from the curing chamber means.

7. The apparatus in accordance with claim 1, wherein the expansion table means comprises expanding pins being insertable into openings of honeycomb panel material, the pins being mounted on a stationary header bar and a movable tow bar for expansion of the honeycomb panels, whereby pulling the tow bar longitudinally across the expansion table means lengthens and narrows the honeycomb panels, thereby sliding the expanding pins laterally inward as the panels narrow, the pins being mounted for universal pivotal action and lateral sliding action.

8. The apparatus in accordance with claim 1 wherein the support means of the curing chamber means have relief holes allowing air and heat to pass through the holes, thereby providing uniform air flow and even heat distribution.

9. The apparatus in accordance with claim 1 wherein the curing chamber means has a substantially cylindrical shape for increased uniformity of temperature distribution and air circulation.

10. The apparatus in accordance with claim 1, further including pinning means mountable on the horizontally movable top portion and insertable through openings in the honeycomb panels for retaining the ends of the expanded honeycomb panels.

11. The apparatus in accordance with claim 1, wherein the expanding and curing apparatus also comprises adhesive application table means for applying adhesive to face sheets which are subsequently attached to the expanded and cured honeycomb panels.

12. The apparatus in accordance with claim 1, wherein the curing chamber means is situated between adjacent expansion table means, a first expansion table means leading into a first end of the curing chamber, and a second expansion table means leading into a second end of the curing chamber.

* * * * *

UNITED STATES PATENT AND TRADEMARK OFFICE
CERTIFICATE OF CORRECTION

PATENT NO. : 4,986,871

DATED : Jan. 22, 1991

INVENTOR(S) : Leslie

It is certified that error appears in the above-identified patent and that said Letters Patent is hereby corrected as shown below:

In Column 6, line 28, "0.004-0.012" should read --.004-.012--.

In the Claims, Claim 1, Column 7, line 51, "curling" should read --curing--; line 54, "sized" should read --sizes--.

Signed and Sealed this

Sixth Day of October, 1992

Attest:

DOUGLAS B. COMER

*Attesting Officer*　　　*Acting Commissioner of Patents and Trademarks*